(12) United States Patent
Uvarov et al.

(10) Patent No.: US 11,734,562 B2
(45) Date of Patent: Aug. 22, 2023

(54) DATA PIPELINE AND DEEP LEARNING SYSTEM FOR AUTONOMOUS DRIVING

(71) Applicant: Tesla, Inc., Austin, TX (US)

(72) Inventors: Timofey Uvarov, San Carlos, CA (US); Brijesh Tripathi, Los Altos, CA (US); Evgene Fainstain, San Jose, CA (US)

(73) Assignee: Tesla, Inc., Austin, TX (US)

( * ) Notice: Subject to any disclaimer, the term of this patent is extended or adjusted under 35 U.S.C. 154(b) by 47 days.

(21) Appl. No.: 17/644,748

(22) Filed: Dec. 16, 2021

(65) Prior Publication Data

US 2022/0107652 A1 Apr. 7, 2022

Related U.S. Application Data

(63) Continuation of application No. 16/013,817, filed on Jun. 20, 2018, now Pat. No. 11,215,999.

(51) Int. Cl.
| | |
|---|---|
| *G06N 3/08* | (2023.01) |
| *G05D 1/02* | (2020.01) |
| *G05D 1/00* | (2006.01) |
| *G06N 3/04* | (2023.01) |
| *G06V 10/10* | (2022.01) |
| *G06V 10/764* | (2022.01) |
| *G06V 10/82* | (2022.01) |

(Continued)

(52) U.S. Cl.
CPC ............ *G06N 3/08* (2013.01); *B60W 60/001* (2020.02); *G05D 1/0088* (2013.01); *G05D 1/0221* (2013.01); *G05D 1/0246* (2013.01); *G06N 3/04* (2013.01); *G06V 10/17* (2022.01); *G06V 10/20* (2022.01); *G06V 10/44* (2022.01); *G06V 10/454* (2022.01); *G06V 10/764* (2022.01); *G06V 10/82* (2022.01); *G06V 20/56* (2022.01)

(58) Field of Classification Search
None
See application file for complete search history.

(56) References Cited

U.S. PATENT DOCUMENTS

| | | | |
|---|---|---|---|
| 6,882,755 B2 | 5/2005 | Silverstein et al. | |
| 7,102,669 B2 | 9/2006 | Skow | |

(Continued)

FOREIGN PATENT DOCUMENTS

| | | | |
|---|---|---|---|
| AU | 2019261735 A1 | 6/2020 | |
| AU | 2019201716 A1 | 10/2020 | |

(Continued)

OTHER PUBLICATIONS

International Search Report and Written Opinion dated Jul. 5, 2019 in application No. PCT/US19/23249.

(Continued)

*Primary Examiner* — Christian Chace
*Assistant Examiner* — Katherine Marie Fitzharris
(74) *Attorney, Agent, or Firm* — Knobbe, Martens, Olson & Bear, LLP

(57) ABSTRACT

An image captured using a sensor on a vehicle is received and decomposed into a plurality of component images. Each component image of the plurality of component images is provided as a different input to a different layer of a plurality of layers of an artificial neural network to determine a result. The result of the artificial neural network is used to at least in part autonomously operate the vehicle.

20 Claims, 6 Drawing Sheets

(51) Int. Cl.
  *G06V 10/44* (2022.01)
  *G06V 10/20* (2022.01)
  *G06V 20/56* (2022.01)
  *B60W 60/00* (2020.01)

(56) References Cited

U.S. PATENT DOCUMENTS

| | | |
|---|---|---|
| 7,209,031 B2 | 4/2007 | Nakai et al. |
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle et al. |
| 8,509,478 B2 | 8/2013 | Haas et al. |
| 8,588,470 B2 | 11/2013 | Rodriguez et al. |
| 8,744,174 B2 | 6/2014 | Hamada et al. |
| 8,773,498 B2 | 7/2014 | Lindbergh |
| 8,912,476 B2 | 12/2014 | Fogg et al. |
| 8,913,830 B2 | 12/2014 | Sun et al. |
| 8,928,753 B2 | 1/2015 | Han et al. |
| 8,953,673 B2 | 2/2015 | Tu |
| 8,972,095 B2 | 3/2015 | Furuno et al. |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,286,524 B1 * | 3/2016 | Mei ............... G06F 18/214 |
| 9,586,455 B2 | 3/2017 | Sugai et al. |
| 9,672,437 B2 | 6/2017 | McCarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,133,273 B2 | 11/2018 | Linke |
| 10,140,252 B2 | 11/2018 | Powers et al. |
| 10,140,544 B1 | 11/2018 | Zhao et al. |
| 10,146,225 B2 | 12/2018 | Ryan |
| 10,152,655 B2 | 12/2018 | Krishnamurthy et al. |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks et al. |
| 10,242,293 B2 | 3/2019 | Shim et al. |
| 10,248,121 B2 | 4/2019 | VandenBerg, III |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel et al. |
| 10,310,087 B2 | 6/2019 | Laddha et al. |
| 10,311,312 B2 | 6/2019 | Yu et al. |
| 10,318,848 B2 | 6/2019 | Dijkman et al. |
| 10,325,178 B1 | 6/2019 | Tang et al. |
| 10,331,974 B2 | 6/2019 | Zia et al. |
| 10,338,600 B2 | 7/2019 | Yoon et al. |
| 10,343,607 B2 | 7/2019 | Kumon et al. |
| 10,359,783 B2 | 7/2019 | Williams et al. |
| 10,366,290 B2 | 7/2019 | Wang et al. |
| 10,372,130 B1 | 8/2019 | Kaushansky et al. |
| 10,373,019 B2 | 8/2019 | Nariyambut Murali et al. |
| 10,373,026 B1 | 8/2019 | Kim et al. |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp et al. |
| 10,423,934 B1 | 9/2019 | Zanghi et al. |
| 10,436,615 B2 | 10/2019 | Agarwal et al. |
| 10,452,905 B2 | 10/2019 | Segalovitz et al. |
| 10,460,053 B2 | 10/2019 | Olson et al. |
| 10,467,459 B2 | 11/2019 | Chen et al. |
| 10,468,008 B2 | 11/2019 | Beckman et al. |
| 10,468,062 B1 | 11/2019 | Levinson et al. |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | Sivakumar et al. |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez et al. |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neuman |
| 10,565,475 B2 | 2/2020 | Lecue et al. |
| 10,567,674 B2 | 2/2020 | Kirsch |
| 10,568,570 B1 | 2/2020 | Sherpa et al. |
| 10,572,717 B1 | 2/2020 | Zhu et al. |
| 10,574,905 B2 | 2/2020 | Srikanth et al. |
| 10,579,058 B2 | 3/2020 | Oh et al. |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tuli et al. |
| 10,609,434 B2 | 3/2020 | Singhai et al. |
| 10,614,344 B2 | 4/2020 | Anthony et al. |
| 10,621,513 B2 | 4/2020 | Deshpande et al. |
| 10,627,818 B2 | 4/2020 | Sapp et al. |
| 10,628,432 B2 | 4/2020 | Guo et al. |
| 10,628,686 B2 | 4/2020 | Ogale et al. |
| 10,628,688 B1 | 4/2020 | Kim et al. |
| 10,629,080 B2 | 4/2020 | Kazemi et al. |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang et al. |
| 10,656,657 B2 | 5/2020 | Djuric et al. |
| 10,657,391 B2 | 5/2020 | Chen et al. |
| 10,657,418 B2 | 5/2020 | Marder et al. |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,886 B2 | 6/2020 | Price et al. |
| 10,678,244 B2 | 6/2020 | Landola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |

(56) References Cited

U.S. PATENT DOCUMENTS

| | | | |
|---|---|---|---|
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vailespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalls et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 11,215,999 B2 | 1/2022 | Uvarov et al. |
| 2003/0035481 A1 | 2/2003 | Hahm |
| 2005/0162445 A1 | 7/2005 | Sheasby et al. |
| 2006/0072847 A1 | 4/2006 | Cher et al. |
| 2006/0224533 A1 | 10/2006 | Thaler |
| 2006/0280364 A1 | 12/2006 | Ma et al. |
| 2009/0016571 A1 | 1/2009 | Tijerina et al. |
| 2009/0219994 A1 | 9/2009 | Tu |
| 2010/0118157 A1 | 5/2010 | Kameyama |
| 2011/0109736 A1 | 5/2011 | Mertz |
| 2012/0109915 A1 | 5/2012 | Kamekawa |
| 2012/0110491 A1 | 5/2012 | Cheung |
| 2012/0134595 A1 | 5/2012 | Fonseca et al. |
| 2012/0263352 A1 | 10/2012 | Fan et al. |
| 2015/0104102 A1 | 4/2015 | Carreira et al. |
| 2016/0104438 A1 | 4/2016 | Han |
| 2016/0132786 A1 | 5/2016 | Balan et al. |
| 2016/0328856 A1 | 11/2016 | Mannino et al. |
| 2017/0011281 A1 | 1/2017 | Dihkman et al. |
| 2017/0057514 A1 | 3/2017 | Toyoda et al. |
| 2017/0158134 A1 | 6/2017 | Shigemura |
| 2017/0206434 A1 | 7/2017 | Nariyambut et al. |
| 2018/0012411 A1 | 1/2018 | Richey et al. |
| 2018/0018590 A1 | 1/2018 | Szeto et al. |
| 2018/0039853 A1 | 2/2018 | Liu et al. |
| 2018/0060675 A1 | 3/2018 | Ji et al. |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0121762 A1 | 5/2018 | Han et al. |
| 2018/0150081 A1 | 5/2018 | Gross et al. |
| 2018/0211403 A1 | 7/2018 | Hotson et al. |
| 2018/0247160 A1* | 8/2018 | Rohani ................. B60W 10/18 |
| 2018/0308012 A1 | 10/2018 | Mummadi et al. |
| 2018/0314878 A1 | 11/2018 | Lee et al. |
| 2018/0357511 A1 | 12/2018 | Misra et al. |
| 2018/0374105 A1 | 12/2018 | Azout et al. |
| 2019/0023277 A1 | 1/2019 | Roger et al. |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |

(56) References Cited

U.S. PATENT DOCUMENTS

| | | |
|---|---|---|
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0187718 A1* | 6/2019 | Zou .................... G05D 1/0231 |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | Englard et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |

(56) References Cited

U.S. PATENT DOCUMENTS

| | | |
|---|---|---|
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |

FOREIGN PATENT DOCUMENTS

| | | |
|---|---|---|
| CN | 110599537 A | 12/2010 |
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |
| CN | 107169421 A | 9/2017 |

(56) References Cited

FOREIGN PATENT DOCUMENTS

| | | | |
|---|---|---|---|
| CN | 107507134 A | 12/2017 |
| CN | 107885214 A | 4/2018 |
| CN | 108122234 A | 6/2018 |
| CN | 107133943 B | 7/2018 |
| CN | 1073689268 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 1074516598 B | 4/2020 |
| CN | 1081118738 B | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 111693972 A | 9/2020 |
| CN | 1082295268 B | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 10/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102017116017 A1 | 1/2019 |
| DE | 102018130821 A1 | 6/2020 |
| DE | 102019008316 A1 | 8/2020 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3 007 446 | 4/2016 |
| EP | 3115772 A1 | 1/2017 |
| EP | 2618559 B1 | 8/2017 |
| EP | 3285485 A1 | 2/2018 |
| EP | 2863633 B1 | 2/2019 |
| EP | 3113080 B1 | 5/2019 |
| EP | 3525132 A1 | 8/2019 |
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |

(56) References Cited

FOREIGN PATENT DOCUMENTS

| | | |
|---|---|---|
| GB | 2548087 A | 9/2017 |
| GB | 2577485 A | 4/2020 |
| GB | 2517270 B | 6/2020 |
| JP | 2578262 Y2 | 8/1998 |
| JP | 3941252 B2 | 7/2007 |
| JP | 2007-265292 | 10/2007 |
| JP | 4282583 B2 | 6/2009 |
| JP | 4300098 B2 | 7/2009 |
| JP | 2011-008685 | 1/2011 |
| JP | 2015004922 A | 1/2015 |
| JP | 2016-006626 | 1/2016 |
| JP | 5863536 B2 | 2/2016 |
| JP | 6044134 B2 | 12/2016 |
| JP | 2017-076371 | 4/2017 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 10-2014-0145090 | 12/2014 |
| KR | 101738422 B1 | 5/2017 |
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 02/052835 | 7/2002 |
| WO | WO 09/149178 | 12/2009 |
| WO | WO 16/032398 | 3/2016 |
| WO | WO 16/048108 | 3/2016 |
| WO | WO 16/207875 | 12/2016 |
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/142193 | 7/2020 |
| WO | WO 20/146445 | 7/2020 |
| WO | WO 20/151329 | 7/2020 |
| WO | WO 20/1393357 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

OTHER PUBLICATIONS

Azimi et al., Mar. 19, 2018, Aerial LaneNet: lane marking semantic segmentation in aerial imagery using wavelet-enhanced cost-sensitive symmetric fully convolutional neural networks, arxiv.org, Cornell University Library.

Horgan et al., 2015, Vision-based driver assistance systems; survey, taxonomy and advances, IEEE 18th International Conference on Intelligent Transportation Systems, pp. 2032-2039.

Hatanaka et al., Aug. 2016, Automatic retinal blood vessels extraction based on black hat transformation and high order local autocorrelation, ITE Technical Report, 40(27):27-30.

Teichmann, May 8, 2018, MultiNet: reel-time joint semantic reasoning for autonomous driving, arxiv:1612.07695v2 [cs.CV] 10 pp.

* cited by examiner

DATA PIPELINE AND DEEP LEARNING SYSTEM FOR AUTONOMOUS DRIVING

CROSS REFERENCE TO RELATED APPLICATIONS

This application is a continuation of, and claims priority to, U.S. patent application Ser. No. 16/013,817 titled "DATA PIPELINE AND DEEP LEARNING SYSTEM FOR AUTONOMOUS DRIVING" and filed on Jun. 20, 2018, the disclosure of which is hereby incorporated herein by reference in its entirety.

BACKGROUND OF THE INVENTION

Deep learning systems used to implement autonomous driving typically rely on captured sensor data as input. In traditional learning systems, the captured sensor data is made compatible with a deep learning system by converting the captured data from a sensor format to a format compatible with the initial input layer of the learning system. This conversion may include compression and down-sampling that can reduce the signal fidelity of the original sensor data. Moreover, changing sensors may require a new conversion process. Therefore, there exists a need for a customized data pipeline that can maximize the signal information from the captured sensor data and provide a higher level of signal information to the deep learning network for deep learning analysis.

BRIEF DESCRIPTION OF THE DRAWINGS

Various embodiments of the invention are disclosed in the following detailed description and the accompanying drawings.

DETAILED DESCRIPTION

Figure 1:
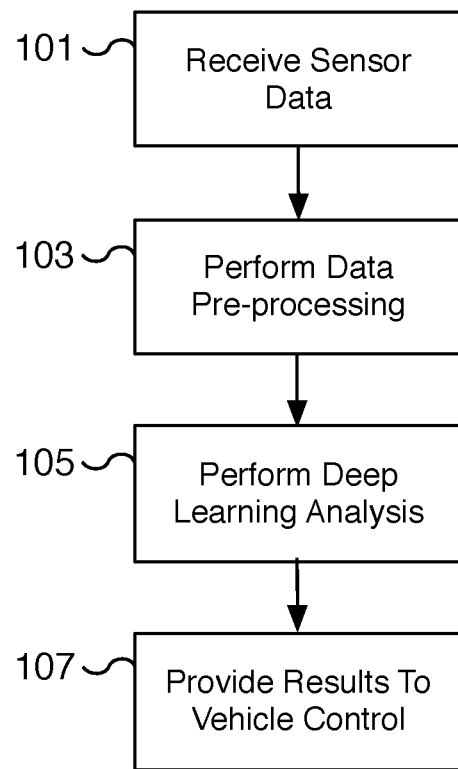
FIG. 1 is a flow diagram illustrating an embodiment of a process for performing machine learning processing using a deep learning pipeline.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A data pipeline that extracts and provides sensor data as separate components to a deep learning network for autonomous driving is disclosed. In some embodiments, autonomous driving is implemented using a deep learning network and input data received from sensors. For example, sensors affixed to a vehicle provide real-time sensor data, such as vision, radar, and ultrasonic data, of the vehicle's surrounding environment to a neural network for determining vehicle control responses. In some embodiments, the network is implemented using multiple layers. The sensor data is extracted into two or more different data components based on the signal information of the data. For example, feature and/or edge data may be extracted separate from global data such as global illumination data into different data components. The different data components retain the targeted relevant data, for example, data that will eventually be used to identify edges and other features by a deep learning network. In some embodiments, the different data components function as containers that store data highly relevant for identifying certain targeted features but do not themselves identify or detect the features. The different data components extract data to ensure accurate feature detection at an appropriate stage of a machine learning network. In some embodiments, the different data components may then be pre-processed to enhance the particular signal information that they contain. The data components can be compressed and/or down-sampled to increase resource and computational efficiency. The different data components are then provided to the deep learning system at different layers of the system. The deep learning network is able to accurately identify and detect the features associated with the targeted data (e.g., edges, objects, etc.) of the data component using the signal information retained during extraction as input. For example, feature and edge data is provided to the first layer of the network and global data to a later layer of the network. By extracting different data components that each retain their respective targeted signal information, the network more efficiently processes the sensor data. Instead of receiving the sensor data as an initial input to the network, the network is provided with the most useful information at the most appropriate layer of the network. In some embodiments, a more complete version of the captured sensor data is analyzed by the network since the different data components can fully utilize the image resolution of their respective components for their intended purposes. For example, input for features and edges can utilize the entire resolution, bit range, and bit depth for feature and edge data whereas input for global illumination can utilize the entire resolution, bit range, and bit depth for global illumination data.

In some embodiments, an image captured using a sensor on a vehicle is received. For example, an image is captured from a high dynamic range forward-facing camera. As another example, ultrasonic data is captured from a side-facing ultrasonic sensor. In some embodiments, the received image is decomposed into a plurality of component images. For example, feature data is extracted from a captured high dynamic range image. As another example, global illumination data is extracted from the captured high dynamic range image. As another example, the image may be decomposed using high-pass, low-pass, and/or band-pass filters. In some embodiments, each component image of the plurality of component images is provided as a different input to a different layer of a plurality of layers of an artificial neural network to determine a result. For example, an artificial neural network such as a convolutional neural network includes multiple layers for processing input data. The different component images decomposed from the captured image are presented as input to different layers of the neural network. For example, feature data is presented as input to the first layer of the network and global data is presented as input to a later layer (e.g., the third layer) of the network. In some embodiments, the result of the artificial neural network is used to at least in part autonomously operate the vehicle. For example, the result of deep learning analysis using the artificial neural network is used to control the steering, breaking, lighting, and/or warning systems of the vehicle. In some embodiments, the result is used to autonomously match the vehicle's speed to traffic conditions, steer the vehicle to follow a navigational path, avoid collisions when an object is detected, summon the vehicle to a desired location, and warn the user of potential collisions, among other autonomous driving applications.

In some embodiments, a vehicle is affixed with multiple sensors for capturing data. For example, in some embodiments, eight surround cameras are affixed to a vehicle and provide 360 degrees of visibility around the vehicle with a range of up to 250 meters. In some embodiments, camera sensors include a wide forward camera, a narrow forward camera, a rear view camera, forward looking side cameras, and/or rearward looking side cameras. In some embodiments, ultrasonic and radar sensors are used to capture surrounding details. For example, twelve ultrasonic sensors may be affixed to the vehicle to detect both hard and soft objects. In some embodiments, a forward-facing radar is utilized to capture data of the surrounding environment. In various embodiments, radar sensors are able to capture surrounding detail despite heavy rain, fog, dust, and other vehicles. The various sensors are used to capture the environment surrounding the vehicle and the captured image is provided for deep learning analysis.

Using data captured from sensors and analyzed using the disclosed deep learning system, a machine learning result is determined for autonomous driving. In various embodiments, the machine learning result is provided to a vehicle control module for implementing autonomous driving features. For example, a vehicle control module can be used to control the steering, braking, warning systems, and/or lighting of the vehicle. In some embodiments, the vehicle is controlled to navigate roads, match the speed of the vehicle to traffic conditions, keep the vehicle within a lane, automatically change lanes without requiring driver input, transition the vehicle from one freeway to another, exit the freeway when approaching a destination, self-park the vehicle, and summon the vehicle to and from a parking spot, among other autonomous driving applications. In some embodiments, the autonomous driving features include identifying opportunities to move the vehicle into a faster lane when behind slower traffic. In some embodiments, the machine learning result is used determine when autonomous driving without driver interaction is appropriate and when it should be disabled. In various embodiments, the machine learning result is used to assist a driver in driving the vehicle.

In some embodiments, the machine learning result is used to implement a self-parking mode where the vehicle will automatically search for a parking spot and park the vehicle. In some embodiments, the machine learning result is used to navigate the vehicle using a destination from a user's calendar. In various embodiments, the machine learning result is used to implement autonomous driving safety features such as collision avoidance and automatic emergency braking. For example, in some embodiments, the deep learning system detects objects that may impact with the vehicle and the vehicle control module applies the brakes accordingly. In some embodiments, the vehicle control module uses the deep learning analysis to implement a side, front, and/or rear collision warning that warns the user of the vehicle of potential collisions with obstacles alongside, in front, or behind the vehicle. In various embodiments, the vehicle control module can activate warning systems such as collision alerts, audio alerts, visual alerts, and/or physical alerts (such as vibration alerts), among others, to inform the user of an emergency situation or when the driver's attention is necessary. In some embodiments, the vehicle control module can initiate a communication response such as an emergency response call, a text message, a network update, and/or another communication response as appropriate, for example, to inform another party of an emergency situation. In some embodiments, the vehicle control module can adjust the lighting including the high/low beams, brake lights, interior light, emergency lights, etc. based on the deep learning analysis results. In some embodiments, the vehicle control module can further adjust the audio in or around the vehicle including using the horn, modifying the audio (e.g., music, phone calls, etc.) playing from the vehicle's sound system, adjusting the volume of the sound system, playing audio alerts, enabling a microphone, etc. based on deep learning analysis results.

FIG. 1 is a flow diagram illustrating an embodiment of a process for performing machine learning processing using a deep learning pipeline. For example, the process of FIG. 1 may be utilized to implement autonomous driving features for self-driving and driver-assisted automobiles to improve safety and to reduce the risk of accidents. In some embodiments, the process of FIG. 1 pre-processes data captured by sensors for deep learning analysis. By pre-processing the sensor data, the data provided for deep learning analysis is enhanced and results in a more accurate result for controlling a vehicle. In some embodiments, the pre-processing addresses data mismatches between data captured by sensors and data expected by a neural network for deep learning.

At 101, sensor data is received. For example, sensor data is captured by one or more sensors affixed to a vehicle. In some embodiments, the sensors are affixed to the environment and/or other vehicles and data is received remotely. In various embodiments, the sensor data is image data, such as RGB or YUV channels of an image. In some embodiments, the sensor data is captured using a high dynamic range camera. In some embodiments, the sensor data is radar, LiDAR, and/or ultrasonic data. In various embodiments, LiDAR data is data captured using laser light and may includes techniques referred to as Light Detection And Ranging as well as Laser Imaging, Detection and Ranging. In various embodiments, the bit depth of the sensor data exceeds the bit depth of the neural network for deep learning analysis.

At 103, data pre-processing is performed on the sensor data. In some embodiments, one or more pre-processing passes may be performed on the sensor data. For example, the data may be first pre-processed to remove noise, to correct for alignment issues and/or blurring, etc. In some embodiments, two or more different filtering passes are performed on the data. For example, a high-pass filter may be performed on the data and a low-pass filter may be performed on the data. In some embodiments, one or more band pass filters may be performed. For example, one or more band passes may be performed on the data in addition to a high-pass and a low-pass. In various embodiments, the sensor data is separated into two or more data sets such as a high-pass data set and a low-pass data set. In some embodiments, one or more band pass data sets are also created. In various embodiments, the different data sets are different components of the sensor data.

In some embodiments, the different components created by pre-processing the data include a feature and/or edge component and a global data component. In various embodiments, the feature and/or edge component is created by performing a high-pass or band-pass filter on the sensor data and the global data component is created by performing a low-pass or band-pass filter on the sensor data. In some embodiments, one or more different filter techniques may be used to extract feature/edge data and/or global data.

In various embodiments, one or more components of the sensor data are processed. For example, a high-pass component may be processed by removing noise from and/or enhancing local contrast for the image data. In some embodiments, the low-pass component is compressed and/or down-sampled. In various embodiments, different components are compressed and/or down-sampled. For example, components may be compressed, resized, and/or down-sampled as appropriate to adjust the size and/or resolution of the data for inputting the data to a layer of a machine learning model. In some embodiments, the bit depth of the sensor data is adjusted. For example, a data channel of a camera capturing data at 20-bits or another appropriate bit depth is compressed or quantized to 8-bits to prepare the channel for an 8-bit machine learning model. In some embodiments, one or more sensors capture data at a bit depth of 12-bits, 16-bits, 20-bits, 32-bits, or another appropriate bit depth that is larger than the bit depth used by the deep learning network.

In various embodiments, the pre-processing performed at 103 is performed by an image pre-processor. In some embodiments, the image pre-processor is a graphics processing unit (GPU), a central processing unit (CPU), an artificial intelligence (AI) processor, an image signal processor, a tone-mapper processor, or other similar hardware processor. In various embodiments, different image pre-processors are used to extract and/or pre-process different data components in parallel.

At 105, deep learning analysis is performed. For example, deep learning analysis is performed using a machine learning model such as an artificial neural network. In various embodiments, the deep learning analysis receives the processed sensor data for 103 as input. In some embodiments, the processed sensor data is received at 105 as multiple different components, such as a high-pass data component and a low-pass data component. In some embodiments, the different data components are received as inputs to different layers of the machine learning model. For example, a neural network receives a high-pass component as an initial input to the first layer of the network and a low-pass component as input to a subsequent layer of the network.

At 107, the results of the deep learning analysis are provided for vehicle control. For example, the results may be provided to a vehicle control module to adjust the speed and/or steering of the vehicle. In various embodiments, the results are provided to implement autonomous driving functionality. For example, the results may indicate an object that should be avoided by steering the vehicle. As another example, the results may indicate a merging car that should be avoided by braking and changing the vehicle's positioning in the lane.

Figure 2:
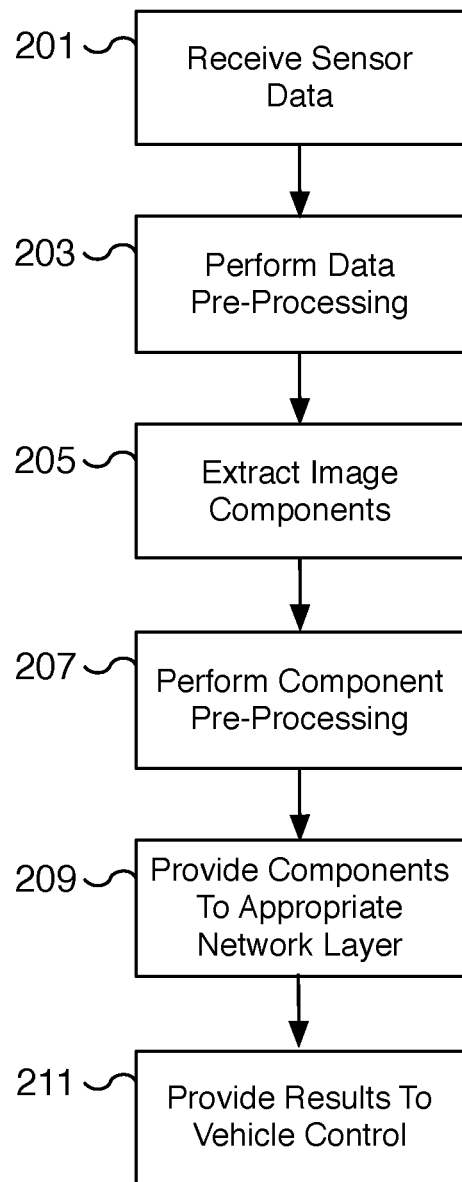
FIG. 2 is a flow diagram illustrating an embodiment of a process for performing machine learning processing using a deep learning pipeline.

FIG. 2 is a flow diagram illustrating an embodiment of a process for performing machine learning processing using a deep learning pipeline. For example, the process of FIG. 2 may be utilized to pre-process sensor data, extract image components from the sensor data, pre-process the extracted image components, and then provide the components for deep learning analysis. The results of deep learning analysis may be used to implement autonomous driving to improve safety and to reduce the risk of accidents. In some embodiments, the process of FIG. 2 is used to perform the process of FIG. 1. In some embodiments, step 201 is performed at 101 of FIG. 1; steps 203, 205, 207, and/or 209 are performed at 103 of FIG. 1; and/or step 211 is performed at 105 and/or 107 of FIG. 1. By processing the extracted components of the sensor data, the processed data provided to a machine learning model is enhanced to achieve superior results from deep learning analysis rather than using otherwise non-enhanced data. In the example shown, the results of the deep learning analysis are used for vehicle control.

At 201, sensor data is received. In various embodiments, the sensor data is image data captured from a sensor such as a high dynamic range camera. In some embodiments, the sensor data is captured from one or more different sensors. In some embodiments, the image data is captured using a 12-bit or higher bit depth to increase the fidelity of the data.

At 203, the data is pre-processed. In some embodiments, the data is pre-processed using an image pre-processor such as an image signal processor, a graphics processing unit (GPU), a tone-mapper processor, a central processing unit (CPU), an artificial intelligence (AI) processor, or other similar hardware processor. In various embodiments, linearization, demosaicing, and/or another processing techniques may be performed on the captured sensor data. In various embodiments, pre-processing is performed on the high-resolution sensor data to enhance the fidelity of the captured data and/or to reduce the introduction of errors by subsequent steps. In some embodiments, the pre-processing step is optional.

At 205, one or more image components are extracted. In some embodiments, two image components are extracted. For example, a feature/edge data component of the sensor data is extracted and a global data component of the sensor data is extracted. In some embodiments, a high-pass component and a low-pass component of the sensor data are extracted. In some embodiments, one or more additional band-pass components are extracted from the sensor data. In various embodiments, high-pass, low-pass, and/or band-pass filters are used to extract different components of the sensor data. In some embodiments, the image components are extracted using a tone mapper. In some embodiments, the global data and/or low-pass component data is extracted by down-sampling the sensor data using a binning or similar technique. In various embodiments, the extraction retains and saves the targeted signal information as an image data component but does not actually detect or identify the features related to the targeted information. For example, the extraction of an image component corresponding to edge data results in an image component with targeted signal information for accurately identifying edges but the extraction performed at 205 does not detect the existence of edges in the sensor data.

In some embodiments, the image data component extracted for a first layer of a machine learning network is extracted using a process that preserves the response of the first layer of the deep learning analysis. For example, the relevant signal information for the first layer is preserved such that the result of the analysis performed on the image component after the analysis of the first layer is similar to the analysis performed on the corresponding sensor data prior to extraction into image components. In various embodiments, the results are preserved for filters as small as a 5×5 matrix filter.

In some embodiments, an extracted data component is created by combining multiple channels of the captured image into one or more channels. For example, red, green, and blue channels may be averaged to create a new channel for a data component. In various embodiments, an extracted data component may be constructed from one or more different channels of the source capture data and/or one or more different captured images of different sensors. For example, data from multiple sensors may be combined into a single data component.

In some embodiments, an image pre-processor such as the pre-processor of step 203 is used to extract the different components. In some embodiments, an image signal processor may be used to extract the different components. In various embodiments, a graphics processing unit (GPU) may be used to extract the different components. In some embodiments, a different pre-processor is used to extract different components so that multiple components can be extracted in parallel. For example, an image signal processor may be used to extract a high-pass component and a GPU may be used to extract a low-pass component. As another example, an image signal processor may be used to extract a low-pass component and a GPU may be used to extract a high-pass component. In some embodiments, a tone-mapper processor is used to extract an image component (such as a high-pass component) and a GPU is used to extract a separate image component (such as a low-pass component) in parallel. In some embodiments, the tone-mapper is part of an image signal processor. In some embodiments, multiple instances of similar pre-processors exist to perform extractions in parallel.

At 207, component pre-processing is performed. In some embodiments, an image pre-processor such as the pre-processor of step 203 and/or 205 is used to pre-process one or more components. In some embodiments, a different pre-processor is used to pre-process different components so that the pre-processing can be performed on the different components in parallel. For example, an image signal processor may be used to process a high-pass component and a graphics processing unit (GPU) may be used to process a low-pass component. In some embodiments, a tone-mapper processor is used to process one image component and a GPU is used to process a separate image component in parallel. In some embodiments, multiple instances of similar pre-processors exist for processing different components in parallel.

In various embodiments, the pre-processing includes down-sampling and/or compressing the image component data. In some embodiments, the pre-processing includes removing noise from the component data. In some embodiments, the pre-processing includes compressing or quantizing the captured data from 20-bit down to 8-bit data fields. In some embodiments, the pre-processing includes converting the size of the image component to a lower resolution. For example, an image component may be half, a quarter, an eighth, a sixteenth, one thirty-second, one sixty-fourth, or another appropriate scaling of the original sensor image size. In various embodiments, an image component is reduced to a size appropriate to the input layer of the machine learning model.

At 209, components are provided to the appropriate network layer of the deep learning network. For example, different components may be provided to different layers of the network. In some embodiments, the network is a neural network with multiple layers. For example, the first layer of a neural network receives as input high-pass component data. One of the subsequent network layers receives as input low-pass component data corresponding to global illumination data. In various embodiments, the different components extracted at 205 and pre-processed at 207 are received at different layers of the neural network. As another example, a feature and/or edge data component is provided as input to the first layer of a deep learning network such as an artificial neural network. A global data component is provided to a subsequent layer and can be provided as a compressed and/or down-sampled version of the data since the global data does not require as much precision as feature and/or edge component data. In various embodiments, global data is more easily compressed without losing information and can be provided at a later layer of the network.

In some embodiments, the machine learning model is made up of multiple sequential layers where the one or more subsequent layers receive input data that has a size property that is smaller in size than a previous layer. For example, the first layer to a network may receive an image size similar to the capture image size. Subsequent layers may receive input data that is a half or a quarter of the capture image size. The reduction in input data size reduces the computation of subsequent layers and improves the efficiency of the deep learning analysis. By providing the sensor input data as different components and at different layers, computational efficiency is increased. Earlier layers of the network require increased computation in particular because the amount of data and the data size is larger than subsequent layers. Subsequent layers may be more efficient to compute since the input data has been compressed by previous layers of the network and/or the pre-processing at 207.

At 211, results of the deep learning analysis are provided for vehicle control. For example, machine learning results using the processed image components may be utilized to control a vehicle's movement. In some embodiments, the results correspond to vehicle control actions. For example, results may correspond to the speed and steering of the vehicle. In some embodiments, the results are received by a vehicle control module used to help maneuver the vehicle. In some embodiments, the results are utilized to improve the safety of the vehicle. In various embodiments, the results provided at 211 are determined by performing a deep learning analysis on the components provided at 209.

Figure 3:
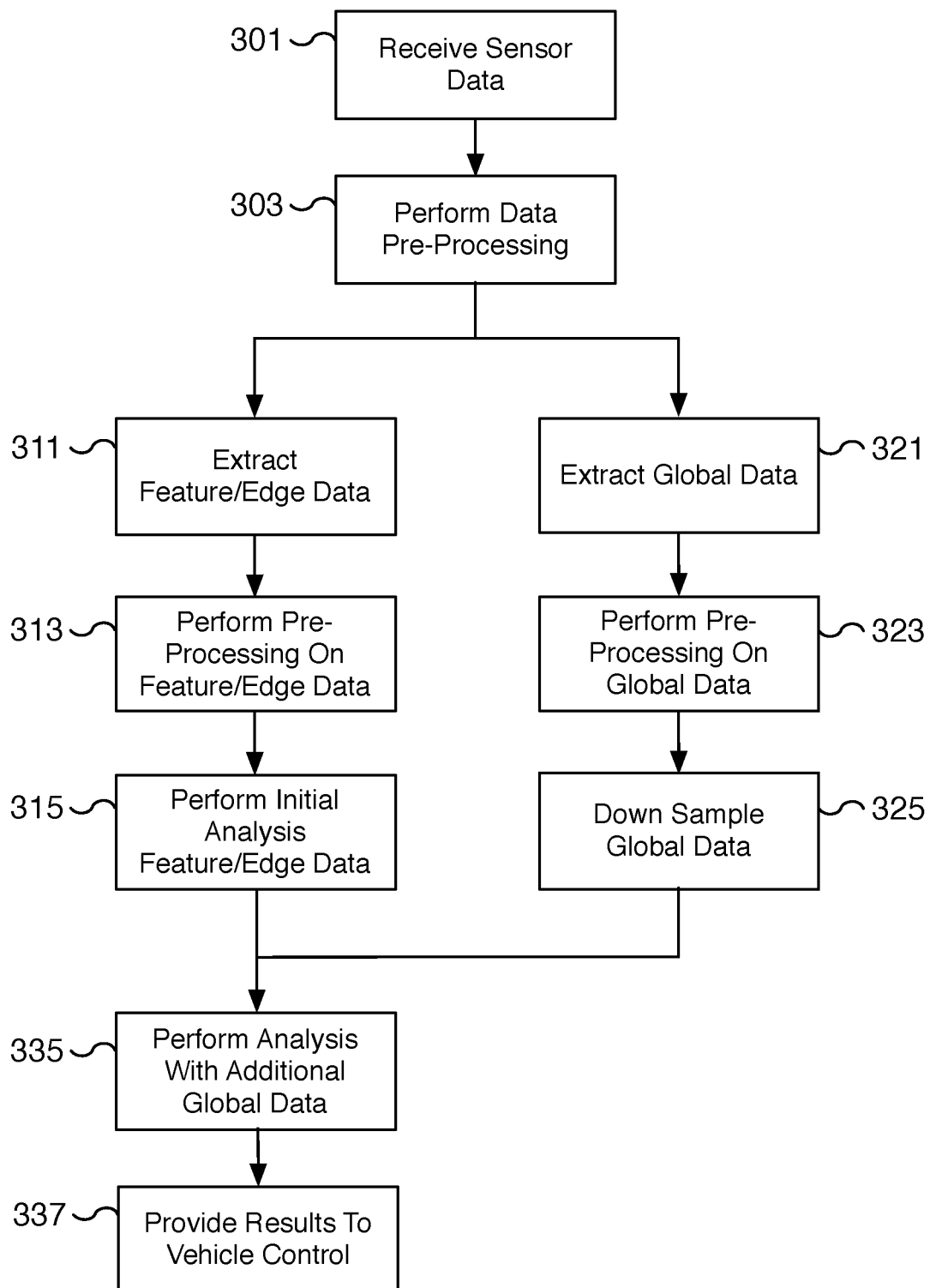
FIG. 3 is a flow diagram illustrating an embodiment of a process for performing machine learning processing using component data.

FIG. 3 is a flow diagram illustrating an embodiment of a process for performing machine learning processing using component data. In the example shown, the process of FIG. 3 is used to extract feature and edge data from sensor data separate from global data. The two data sets are then fed into a deep learning network at different stages to infer vehicle control results. By separating the two components and providing them at different stages, the initial layers of the network can dedicate computational resources to initial edges and feature detection. In some embodiments, the initial stages dedicate resources to the initial identification of the objects such as roads, lane markers, obstacles, vehicles, pedestrians, traffic signs, etc. Subsequent layers can utilize the global data in a more computational efficient manner since the global data is less resource intensive. Since machine learning can be computational and data intensive, a data pipeline utilizing different image components at different stages is utilized to increase the efficiency of the deep learning computation and to reduce data resource requirements needed for the analysis. In some embodiments, the process of FIG. 3 is used to perform the process of FIG. 1 and/or FIG. 2. In some embodiments, step 301 is performed at 101 of FIG. 1 and/or at 201 of FIG. 2; step 303 is performed at 103 of FIG. 1 and/or at 203 of FIG. 2; steps 311 and/or 321 are performed at 103 of FIG. 1 and/or at 205 of FIG. 2; steps 313, 323, and/or 325 are performed at 103 of FIG. 1 and/or at 207 and 209 of FIG. 2; steps 315 and/or 335 are performed at 105 of FIG. 1 and/or at 211 of FIG. 2; and/or step 337 is performed at 107 of FIG. 1 and/or at 211 of FIG. 2.

At 301, sensor data is received. In various embodiments, the sensor data is data captured by one or more sensors of the vehicle. In some embodiments, the sensor data is received as described with respect to step 101 of FIG. 1 and/or step 201 of FIG. 2.

At 303, data pre-processing is performed. For example, the sensor data is enhanced by pre-processing the data. In some embodiments, the data is cleaned up, for example, by performing a de-noising, alignment, or other appropriate filter. In various embodiments, the data is pre-processed as described with respect to step 103 of FIG. 1 and/or step 203 of FIG. 2. In the example shown, processing continues to steps 311 and 321. In some embodiments, processing at 311 and 321 are run in parallel to extract and process different components of the sensor data. In some embodiments, each branch of processing (e.g., the branch starting at 311 and the branch starting at 321) is run sequentially or pipelined. For example, processing is performed starting with step 311 to prepare data for the initial layers of a network. In some embodiments, the pre-processing step is optional.

At 311, feature and/or edge data is extracted from the sensor data. For example, feature data and/or edge data is extracted from the captured sensor data into a component data. In some embodiments, the component data retains the relevant signal information from the sensor data for identifying features and/or edges. In various embodiments, the extraction process preserves the signal information critical for identifying and detecting features and/or edges and does not actually identify or detect the features or edges from the sensor data. In various embodiments, the features and/or edges are detected during one or more analysis steps at 315 and/or 335. In some embodiments, the extracted feature and/or edge data has the same bit depth as the original captured data. In some embodiments, the extracted data is feature data, edge data, or a combination of feature and edge data. In some embodiments, a high-pass filter is used to extract feature and/or edge data from the sensor data. In various embodiments, a tone-mapper processor is calibrated to extract feature and/or edge data from the sensor data.

At 313, pre-processing is performed on the feature and/or edge data. For example, a de-noising filter may be applied to the data to improve the signal quality. As another example, different pre-processing techniques such as local contrast enhancement, gain adjustment, thresholding, noise filtering, etc. may be applied to enhance the feature and edge data prior to deep learning analysis. In various embodiments, the pre-processing is customized to enhance the feature and edge properties of the data rather than applying a more generic pre-processing technique to the sensor data as a whole. In some embodiments, the pre-processing includes performing a compression and/or down-sampling on the extracted data. In some embodiments, the pre-processing step at 313 is optional.

At 315, an initial analysis is performed using the feature and/or edge data. In some embodiments, the initial analysis is a deep learning analysis using a machine learning model such as a neural network. In various embodiments, the initial analysis receives the feature and edge data as input to the first layer of the network. In some embodiments, the initial layer of the network prioritizes the detection of features and/or edges in the captured image. In various embodiments, the deep learning analysis is performed using an artificial neural network such as a convolutional neural network. In some embodiments, the analysis is run on an artificial intelligence (AI) processor.

At 321, global data is extracted from the sensor data. For example, global data is extracted from the captured sensor data into a component data. In some embodiments, the global data corresponds to global illumination data. In some embodiments, the extracted global data has the same bit depth as the original captured data. In some embodiments, a low-pass filter is used to extract global data from the sensor data. In various embodiments, a tone-mapper processor is calibrated to extract global data from the sensor data. Other techniques, such as binning, resampling, and down-sampling may also be used to extract global data. In various embodiments, the extraction process retains data likely to be globally relevant and does not identify and detect the global features from the sensor data. In various embodiments, the global features are detected by the analysis performed at 335.

At 323, pre-processing is performed on the global data. For example, a de-noising filter may be applied to the data to improve the signal quality. As another example, different pre-processing techniques such as local contrast enhancement, gain adjustment, thresholding, noise filtering, etc. may be applied to enhance the global data prior to deep learning analysis. In various embodiments, the pre-processing is customized to enhance the properties of the global data rather than applying a more generic pre-processing technique to the sensor data as a whole. In some embodiments, the pre-processing of the global data includes compressing the data. In some embodiments, the pre-processing step at 323 is optional.

At 325, the global data is down-sampled. For example, the resolution of the global data is reduced. In some embodiments, the global data is reduced in size to improve the computational efficiency of analyzing the data and to configure the global data as input to a later layer of the deep learning network. In some embodiments, the global data is down-sampled by binning, resampling, or another appropriate technique. In some embodiments, the down-sampling is performed using a graphical processing unit (GPU) or an image signal processor. In various embodiments, down-sampling is appropriate for global data since the global data does not have the same resolution requirements as feature and/or edge data. In some embodiments, the down-sampling performed at 325 is performed when the global data is extracted at 321.

At 335, additional deep learning analysis is performed using results of the deep learning analysis on the feature and/or edge data and the global data as input. In various embodiments, the deep learning analysis receives as input the global data at a later layer of the deep learning network. In various embodiments, the expected input data size at the layer receiving the global data is smaller than the expected input data size of the initial input layer. For example, the input size for the global data input layer may be a half or a quarter of the input size for the initial layer of the deep learning network. In some embodiments, the later layers of the network utilize global data to enhance the results of the initial layers. In various embodiments, the deep learning analysis is performed and a vehicle control result is determined. For example, a vehicle control result is determined using a convolutional neural network. In some embodiments, the analysis is run on an artificial intelligence (AI) processor.

At 337, the results of deep learning analysis are provided for vehicle control. For example, machine learning results using the extracted and processed image components are utilized to control a vehicle's movement. In some embodiments, the results correspond to vehicle control actions. In some embodiments, the results are provided as described with respect to step 107 of FIG. 1 and/or step 211 of FIG. 2.

Figure 4:
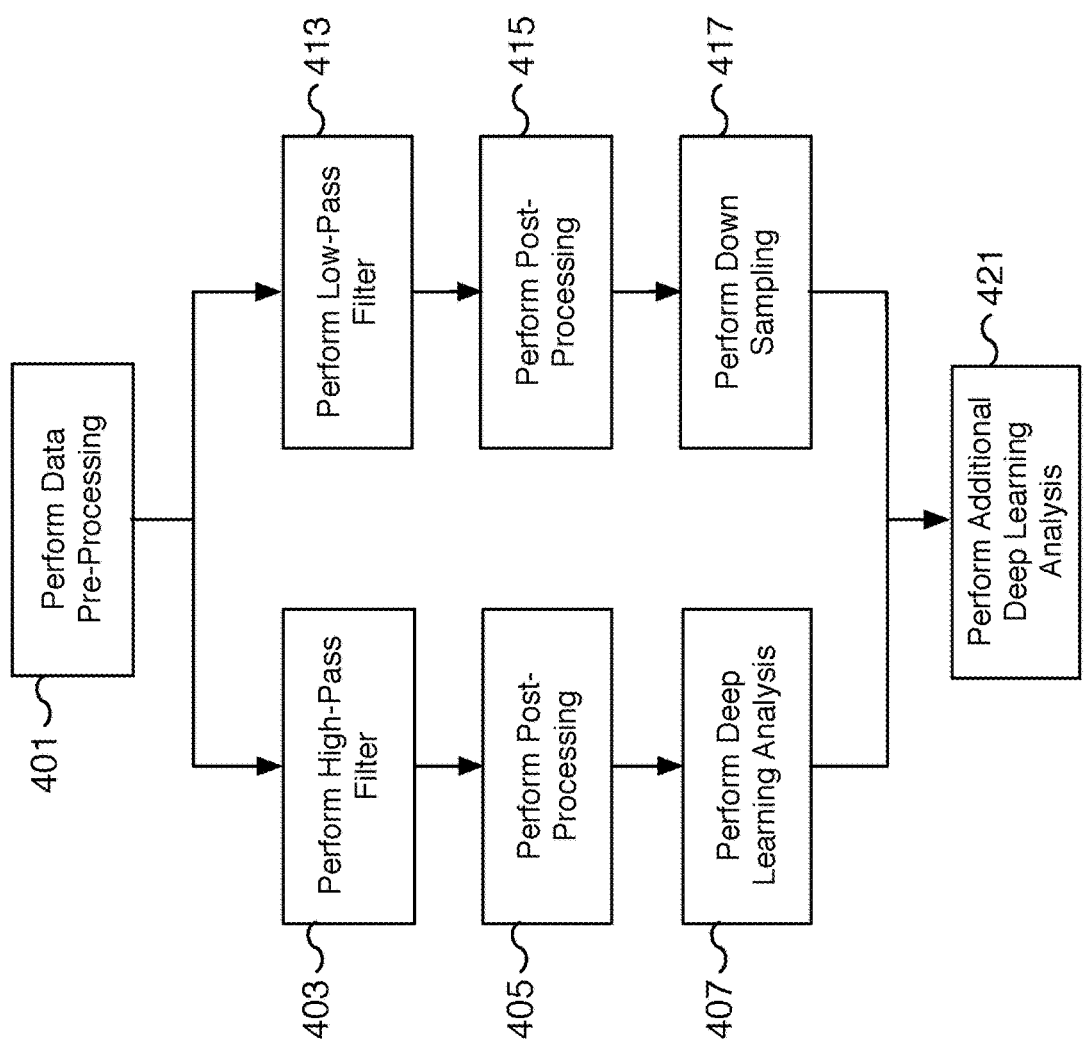
FIG. 4 is a flow diagram illustrating an embodiment of a process for performing machine learning processing using high-pass and low-pass component data.

FIG. 4 is a flow diagram illustrating an embodiment of a process for performing machine learning processing using high-pass and low-pass component data. In the example shown, the process of FIG. 4 is used to extract two data components from sensor data and to provide the components to different layers of a deep learning network such as an artificial neural network. The two components are extracted using a high-pass and low-pass filter. In various embodiments, the results are used to implement autonomous driving with improved precision, safety, and/or comfort results. In some embodiments, the process of FIG. 4 is used to perform the process of FIGS. 1, 2, and/or 3. In some embodiments, step 401 is performed at 103 of FIG. 1, at 203 of FIG. 2, and/or at 303 of FIG. 3; step 403 is performed at 103 of FIG. 1, at 205 of FIG. 2, and/or at 311 of FIG. 3; step 413 is performed at 103 of FIG. 1, at 205 of FIG. 2, and/or at 321 of FIG. 3; step 405 is performed at 103 of FIG. 1, at 207 and 209 of FIG. 2, and/or at 313 of FIG. 3; steps 415 and 417 are performed at 103 of FIG. 1, at 207 and 209 of FIG. 2, and/or at 323 and 325 of FIG. 3; step 407 is performed at 105 of FIG. 1, at 211 of FIG. 2, and/or at 315 of FIG. 3; and/or step 421 is performed at 105 of FIG. 1, at 211 of FIG. 2, and/or at 335 of FIG. 3.

At 401, data is pre-processed. In some embodiments, the data is the sensor data captured from one or more sensors such as high dynamic range camera, radar, ultrasonic, and/or LiDAR sensors. In various embodiments, the data is pre-processed as described with respect to 103 of FIG. 1, 203 of FIG. 2, and/or 303 of FIG. 3. Once the data is pre-processed, processing continues to 403 and 413. In some embodiments, steps 403 and 413 are run in parallel.

At 403, a high-pass filter is performed on the data. For example, a high-pass filter is performed on the captured sensor data to extract high-pass component data. In some embodiments, the high-pass filter is performed using a graphics processing unit (GPU), a tone-mapper processer, an image signal processor, or other image pre-processor. In some embodiments, the high-pass data component represents features and/or edges of the captured sensor data. In various embodiments, the high-pass filter is constructed to preserve the response of the first layer of a deep learning process. For example, a high-pass filter is constructed to preserve the response to a small filter at the top of a machine learning network. The relevant signal information for the first layer of the network is preserved such that the result of the analysis performed on a high-pass component data after the first layer is similar to the analysis performed on non-filtered data after the first layer. In various embodiments, the results are preserved for filters as small as a 5×5 matrix filter.

At 413, a low-pass filter is performed on the data. For example, a low-pass filter is performed on the captured sensor data to extract low-pass component data. In some embodiments, the low-pass filter is performed using a graphics processing unit (GPU), a tone-mapper processer, an image signal processor, or other image pre-processor. In some embodiments, the low-pass data component represents global data of the captured sensor data such as global illumination data.

In various embodiments, the filtering performed at 403 and 413 may use the same or different image pre-processors. For example, a tone-mapper processor is used to extract a high-pass data component and a graphics processing unit (GPU) is used to extract a low-pass data component. In some embodiments, the high-pass or low-pass data is extracted by subtracting one of the data components from the original captured data.

At 405 and 415, post-processing is performed on the respective high-pass and low-pass data components. In various embodiments, different post-processing techniques are utilized to enhance the signal quality and/or to reduce the amount of data required to represent the data. For example, a de-noising, demosaicing, local contrast enhancement, gain adjustment, and/or thresholding process, among others, may be performed on the respective high-pass and/or low-pass data components. In some embodiments, the data components are compressed and/or down-sampled. For example, once the high-pass and/or low-pass data is extracted, the respective data components may be compressed to more efficiently utilize the entire bit depth range. In some embodiments, the respective data components are compressed or quantized from a higher bit depth as captured by sensors to a lower bit depth compatible with the deep learning network. For example, a sensor data captured at 12-bits, 16-bits, 20-bits, 32-bits, or another appropriate bit depth per channel may be compressed or quantized to a lower bit depth such as 8-bits per channel. In some embodiments, the post-processing steps at 405 and/or 415 are optional.

At 417, the low-pass data component is down-sampled. In various embodiments, the low-pass data component is fed into the network at a later stage of the network and may be down-sampled to a more efficient resource size. For example, a low-pass data component may be extracted at the full sensor size and reduced to a half or a quarter of the original size. Other percentages of reductions are possible as well. In various embodiments, the low-pass data is down-sampled but retains the relevant signal information. In many scenarios, the low-pass data can be easily down-sampled without losing signal information. By down-sampling the data, the data is more easily and quickly analyzed at a later layer in the deep learning network.

At 407, deep learning analysis is performed on the high-pass data component. In some embodiments, the high-pass data component is fed into the initial layer of the deep learning network and represents the most significant data for feature and edge detection. In various embodiments, the results of the deep learning analysis on the first layer using the high-pass data component are fed into subsequent layers of the network. For example, a neural network may include multiple layers, for example, five or more layers. The first layer receives the high-pass data component as input and the second layer receives the results of the deep learning analysis performed by the first layer. In various embodiments, the second or later layer receives the low-pass data components as additional input to perform additional deep learning analysis.

At 421, additional deep learning analysis is performed using the results of the analysis performed at 407 and the low-pass data component down-sampled at 417. In various embodiments, the deep learning analysis infers a vehicle control result. For example, the result of the deep learning analysis at 407 and 421 is used to control the vehicle for autonomous driving.

Figure 5:
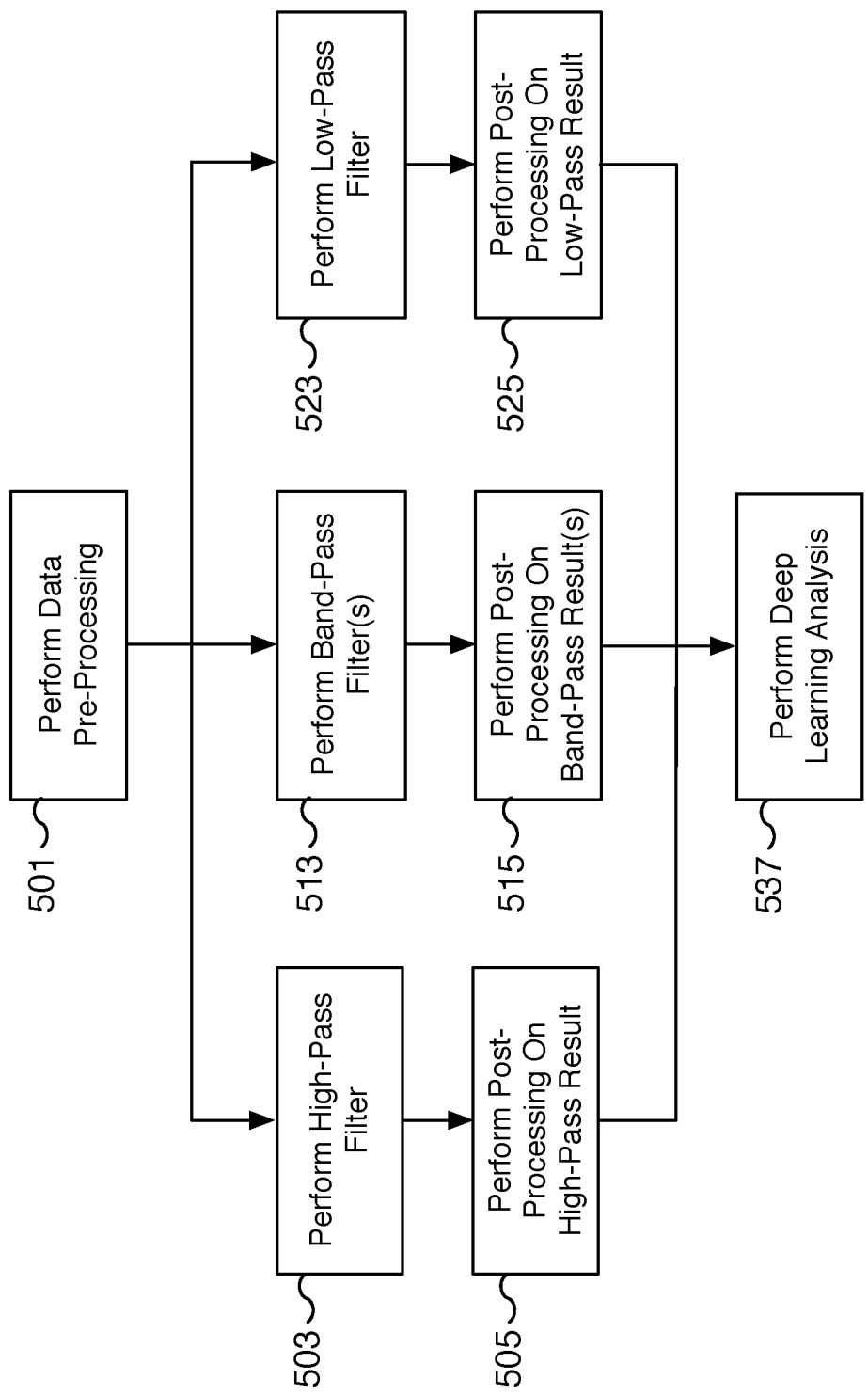
FIG. 5 is a flow diagram illustrating an embodiment of a process for performing machine learning processing using high-pass, band-pass, and low-pass component data.

FIG. 5 is a flow diagram illustrating an embodiment of a process for performing machine learning processing using high-pass, band-pass, and low-pass component data. In the example shown, the process of FIG. 5 is used to extract three or more data components from sensor data and to provide the components at different layers of a deep learning network such as an artificial neural network. Similar to the process of FIG. 4, a high-pass and low-pass component is extracted. In addition, the process of FIG. 5 extracts one or more band-pass data components. In various embodiments, the decomposition of the sensor data into multiple components that are provided to different layers of the deep learning network allows the deep learning analysis to emphasize different sets of data at different layers of the network.

In some embodiments, the process of FIG. 5 is used to perform the process of FIGS. 1, 2, 3, and/or 4. In some embodiments, step 501 is performed at 103 of FIG. 1, at 203 of FIG. 2, at 303 of FIG. 3, and/or at 401 of FIG. 4. In some embodiments, step 503 is performed at 103 of FIG. 1, at 205 of FIG. 2, at 311 of FIG. 3, and/or at 403 of FIG. 4; step 513 is performed at 103 of FIG. 1, at 205 of FIG. 2, and/or at 311 or 321 of FIG. 3; and/or step 523 is performed at 103 of FIG. 1, at 205 of FIG. 2, at 321 of FIG. 3, and/or at 413 of FIG. 4. In some embodiments, step 505 is performed at 103 of FIG. 1, at 207 and 209 of FIG. 2, at 313 of FIG. 3, and/or at step 405 of FIG. 4; step 515 is performed at 103 of FIG. 1, at 207 and 209 of FIG. 2, at 313, 323 and/or 325 of FIG. 3, and/or at 405, 415, and/or 417 of FIG. 4; and/or step 525 is performed at 103 of FIG. 1, at 207 and 209 of FIG. 2, at 323 and 325 of FIG. 3, and/or at 415 and 417 of FIG. 4. In some embodiments, step 537 is performed at 105 of FIG. 1, at 211 of FIG. 2, at 315 and 335 of FIG. 3; and/or at 407 and 421 of FIG. 4.

At 501, data is pre-processed. In some embodiments, the data is the sensor data captured from one or more sensors such as high dynamic range camera, radar, ultrasonic, and/or LiDAR sensors. In various embodiments, the data is pre-processed as described with respect to 103 of FIG. 1, 203 of FIG. 2, 303 of FIG. 3, and/or 401 of FIG. 4. Once the data is pre-processed, processing continues to 503, 513, and 523. In some embodiments, steps 503, 513, and 523 are run in parallel.

At 503, a high-pass filter is performed on the data. For example, a high-pass filter is performed on the captured sensor data to extract high-pass component data. In some embodiments, the high-pass filter is performed using a graphics processing unit (GPU), a tone-mapper processer, an image signal processor, or another image pre-processor. In some embodiments, the high-pass data component represents features and/or edges of the captured sensor data.

At 513, one or more band-pass filters are performed on the data to extract one or more band-pass data components. For example, a band-pass filter is performed on the captured sensor data to extract component data that includes a mix of feature, edge, intermediate, and/or global data. In various embodiments, one more band-pass components may be extracted. In some embodiments, the low-pass filter is performed using a graphics processing unit (GPU), a tone-mapper processer, an image signal processor, or another image pre-processor. In some embodiments, the band-pass data component represents data that is neither primarily edge/feature data nor primarily global data of the captured sensor data. In some embodiments, the band-pass data is utilized to preserve data fidelity that may be lost using only a high-pass data component and a low-pass data component.

At 523, a low-pass filter is performed on the data. For example, a low-pass filter is performed on the captured sensor data to extract low-pass component data. In some embodiments, the low-pass filter is performed using a graphics processing unit (GPU), a tone-mapper processer, an image signal processor, or other image pre-processor. In some embodiments, the low-pass data component represents global data of the captured sensor data such as global illumination data.

In various embodiments, the filtering performed at 503, 513, and 523 may use the same or different image pre-processors. For example, a tone-mapper processor is used to extract a high-pass data component and a graphics processing unit (GPU) is used to extract band-pass, and/or low-pass data components. In some embodiments, data components are extracted by subtracting one or more data components from the original captured data.

At 505, 515, and 525, post-processing is performed on the respective high-pass, band-pass, and low-pass data components. In various embodiments, different post-processing techniques are utilized to enhance the signal quality and/or to reduce the amount of data required to represent the data. In some embodiments, the different components are compressed and/or down-sampled to the appropriate size for the network layer receiving the data component. In various embodiments, the high-pass data will have a higher resolution than the band-pass data and the band-pass data will have a higher resolution than the low-pass data. In some embodiments, different band-pass data components will also have different resolutions as appropriate for the network layer each is provided as input for. In some embodiments, the respective data components are compressed or quantized from a higher bit depth as captured by sensors to a lower bit depth compatible with the deep learning network. For example, a sensor data captured at 12-bits per channel may be compressed or quantized to 8-bits per channel. In various embodiments, the pre-processing filters are applied as described with respect to 207 of FIG. 2 and/or 405, 415, and/or 417 of FIG. 4.

At 537, deep learning analysis is performed using the data component results of 505, 515, and 525. In some embodiments, the high-pass data component is fed into the initial layer of the deep learning network and represents the most significant data for feature and edge detection. The one or more band-pass data components are fed into middle layer(s) of the network and include additional data for identifying features/edges and/or beneficial intermediate or global information. The low-pass data component is fed into a later layer of the network and includes global information to improve the analysis results of the deep learning network. In performing the deep learning analysis, additional data components representing different sensor data are fed into different layers as the analysis progresses to increase the accuracy of the result. In various embodiments, the deep learning analysis infers a vehicle control result. For example, the result of the deep learning analysis is used to control the vehicle for autonomous driving. In some embodiments, a machine learning result is provided to a vehicle control module to at least in part autonomously operate a vehicle.

Figure 6:
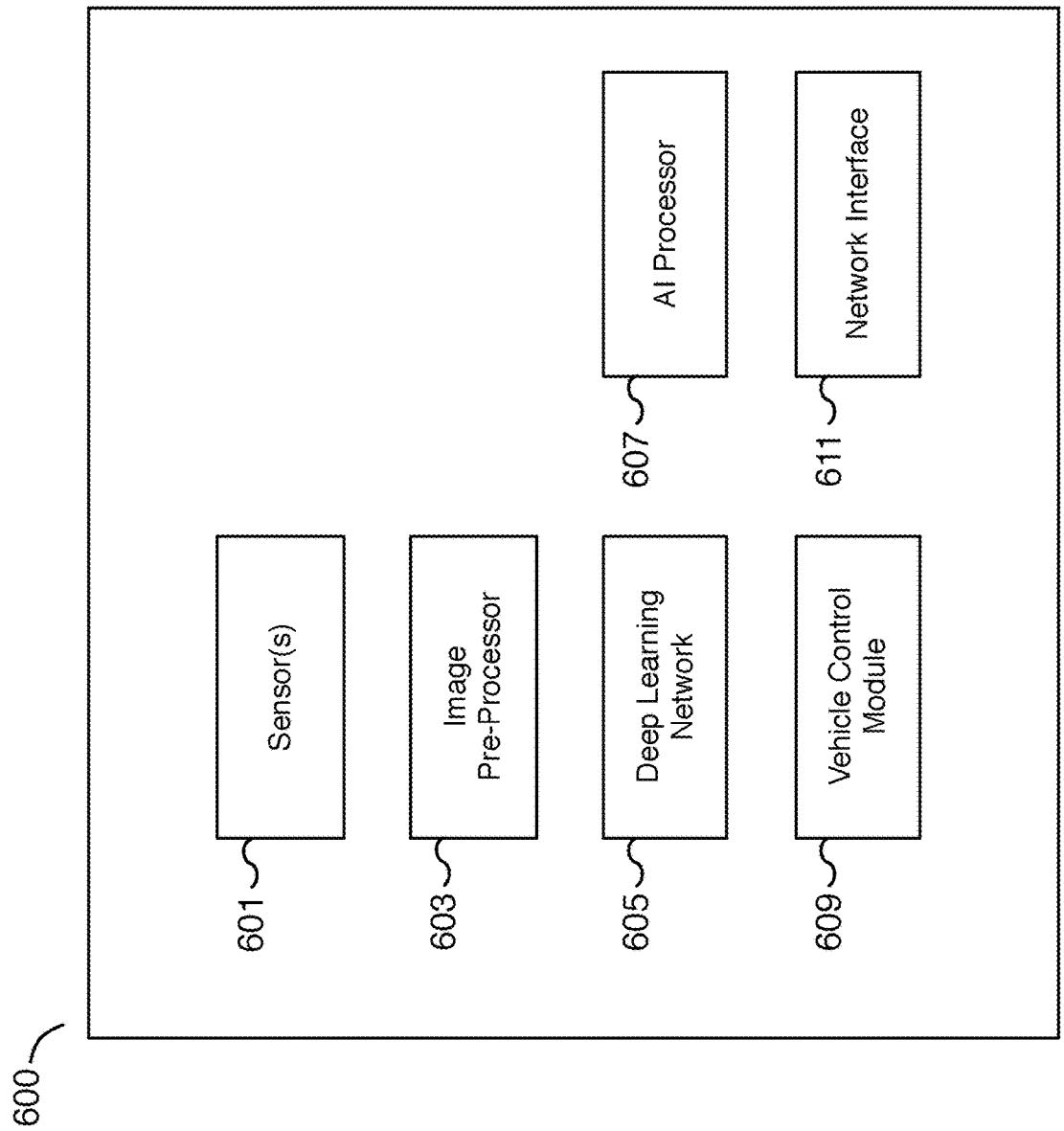
FIG. 6 is a block diagram illustrating an embodiment of a deep learning system for autonomous driving.

FIG. 6 is a block diagram illustrating an embodiment of a deep learning system for autonomous driving. In some embodiments, the deep learning system of FIG. 6 may be used to implement autonomous driving features for self-driving and driver-assisted automobiles. For example, using sensors affixed to a vehicle, sensor data is captured, processed as different input components, and fed into different stages of a deep learning network. The result of deep learning analysis is used by a vehicle control module to assist in the operation of the vehicle. In some embodiments, the vehicle control module is utilized for self-driving or driver-assisted operation of the vehicle. In various embodiments, the processes of FIGS. 1-5 utilize a deep learning system such as the one described in FIG. 6.

In the example shown, deep learning system 600 is a deep learning network that includes sensors 601, image pre-processor 603, deep learning network 605, artificial intelligence (AI) processor 607, vehicle control module 609, and network interface 611. In various embodiments, the different components are communicatively connected. For example, sensor data from sensors 601 is fed to image pre-processor 603. Processed sensor data components of image pre-processor 603 are fed to deep learning network 605 running on AI processor 607. The output of deep learning network 605 running on AI processor 607 is fed to vehicle control module 609. In various embodiment, network interface 611 is used to communicate with remote servers, to make phone calls, to send and/or receive text messages, etc. based on the autonomous operation of the vehicle.

In some embodiments, sensors 601 include one or more sensors. In various embodiments, sensors 601 may be affixed to a vehicle, at different locations of the vehicle, and/or oriented in one or more different directions. For example, sensors 601 may be affixed to the front, sides, rear, and/or roof, etc. of the vehicle in forward-facing, rear-facing, side-facing, etc. directions. In some embodiments, sensors 610 may be image sensors such as high dynamic range cameras. In some embodiments, sensors 601 include non-visual sensors. In some embodiments, sensors 601 include radar, LiDAR, and/or ultrasonic sensors, among others. In some embodiments, sensors 601 are not mounted to the vehicle with vehicle control module 609. For example, sensors 601 may be mounted on neighboring vehicles and/or affixed to the road or environment and are included as part of a deep learning system for capturing sensor data.

In some embodiments, image pre-processor 603 is used to pre-process sensor data of sensors 601. For example, image pre-processor 603 may be used to pre-process the sensor data, split sensor data into one or more components, and/or post-process the one or more components. In some embodiments, image pre-processor 603 is a graphics processing unit (GPU), a central processing unit (CPU), an image signal processor, or a specialized image processor. In various embodiments, image pre-processor 603 is a tone-mapper processor to process high dynamic range data. In some embodiments, image pre-processor 603 is implemented as part of artificial intelligence (AI) processor 607. For example, image pre-processor 603 may be a component of AI processor 607.

In some embodiments, deep learning network 605 is a deep learning network for implementing autonomous vehicle control. For example, deep learning network 605 may be an artificial neural network such as a convolutional neural network (CNN) that is trained using sensor data and used to output vehicle control results to vehicle control module 609. In various embodiments, deep learning network 605 is a multi-stage learning network and can receive input data at two or more different stages of the network. For example, deep learning network 605 may receive feature and/or edge data at a first layer of deep learning network 605 and global data at a later layer (e.g., a second or third, etc. layer) of deep learning network 605. In various embodiments, deep learning network 605 receives data at two or more different layers of the network and may compress and/or downsize the data as it is processed through different layers. For example, the data size at layer one is a resolution that is higher than the data at a subsequent stage. In some embodiments, the data size at layer one is the full resolution of the captured image data and the data at a subsequent layer is a lower resolution (e.g., a quarter of the size) of the captured image data. In various embodiments, the input data received from image pre-processor 603 at subsequent layer(s) of deep learning network 605 matches the internal data resolution(s) of the data that is processed through the one or more previous layers.

In some embodiments, artificial intelligence (AI) processor 607 is a hardware processor for running deep learning network 605. In some embodiments, AI processor 607 is a specialized AI processor for performing inference using a convolutional neural network (CNN) on sensor data. In some embodiments, AI processor 607 is optimized for the bit depth of the sensor data. In some embodiments, AI processor 607 is optimized for deep learning operations such as neural network operations including convolution, dot-product, vector, and/or matrix operations, among others. In some embodiments, AI processor 607 is implemented using a graphics processing unit (GPU). In various embodiments, AI processor 607 is coupled to memory that is configured to provide the AI processor with instructions which when executed cause the AI processor to perform deep learning analysis on the received input sensor data and to determine a machine learning result used to at least in part autonomously operate a vehicle.

In some embodiments, vehicle control module 609 is utilized to process the output of artificial intelligence (AI) processor 607 and to translate the output into a vehicle control operation. In some embodiments, vehicle control module 609 is utilized to control the vehicle for autonomous driving. In some embodiments, vehicle control module 609 can adjust the speed and/or steering of the vehicle. For example, vehicle control module 609 may be used to control a vehicle by braking, steering, changing lanes, accelerating and merging into another lane, etc. In some embodiments, vehicle control module 609 is used to control vehicle lighting such as brake lights, turns signals, headlights, etc. In some embodiments, vehicle control module 609 is used to control vehicle audio conditions such as the vehicle's sound system, playing audio alerts, enabling a microphone, enabling the horn, etc. In some embodiments, vehicle control module 609 is used to control notification systems including warning systems to inform the driver and/or passengers of driving events such as a potential collision or the approach of an intended destination. In some embodiments, vehicle control module 609 is used to adjust sensors such as sensors 601 of a vehicle. For example, vehicle control module 609 may be used to change parameters of one or more sensors such as modifying the orientation, changing the output resolution and/or format type, increasing or decreasing the capture rate, adjusting the captured dynamic range, adjusting the focus of a camera, enabling and/or disabling a sensor, etc. In some embodiments, vehicle control module 609 may be used to change parameters of image pre-processor 603 such as modifying the frequency range of filters, adjusting feature and/or edge detection parameters, adjusting channels and bit depth, etc. In various embodiments, vehicle control module 609 is used to implement self-driving and/or driver-assisted control of a vehicle.

In some embodiments, network interface 611 is a communication interface for sending and/or receiving data including voice data. In various embodiments, a network interface 611 includes a cellular or wireless interface for interfacing with remote servers, to connect and make voice calls, to send and/or receive text messages, etc. For example, network interface 611 may be used to receive an update for the instructions and/or operating parameters for sensors 601, image pre-processor 603, deep learning network 605, AI processor 607, and/or vehicle control module 609. For example, a machine learning model of deep learning network 605 may be updated using network interface 611. As another example, network interface 611 may be used to update firmware of sensors 601 and/or operating parameters of image pre-processor 603 such as image processing parameters. In some embodiments, network interface 611 is used to make emergency contact with emergency services in the event of an accident or near-accident. For example, in the event of a collision, network interface 611 may be used to contact emergency services for help and may inform the emergency services of the location of the vehicle and collision details. In various embodiments, network interface 611 is used to implement autonomous driving features such as accessing calendar information to retrieve and/or update a destination location and/or expected arrival time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving an image captured using a sensor on a vehicle;
    extracting a global data component and a feature data component from the image which form input data, wherein the global data component is associated with global illumination data and the feature data component is associated with edge data;
    providing the input data to a convolutional neural network comprising a plurality of layers, wherein the plurality of layers are sequential and form respective portions of the convolutional neural network, wherein the feature data component is provided as input to a first layer of the plurality of layers, wherein the global data component and an intermediate result output from a prior layer are provided as input to a second layer of the plurality of layers, and wherein the second layer is subsequent to the first layer; and
    obtaining, based on a result of the convolutional neural network, information indicating a vehicle control result which informs autonomous operation of the vehicle.

2. The method of claim 1, wherein subsequent to extraction, the global data component is downsampled, and wherein the downsampled global data component is provided as input to the second layer.

3. The method of claim 1, wherein a denoising filter is applied to the extracted global data component.

4. The method of claim 1, wherein the global data component is extracted via a low-pass filter.

5. The method of claim 1, wherein the feature data component is extracted via a high-pass filter.

6. The method of claim 1, wherein one or more of de-noising, demosaicing, local contrast enhancement, gain adjustment, and/or a thresholding process are performed on at least a portion of the input data.

7. The method of claim 1, wherein the first layer is an initial layer of the convolutional neural network.

8. The method of claim 1, wherein a third data component is extracted from the image via a band-pass filter, and wherein the third data component forms part of the input data.

9. The method of claim 1, wherein the third data component is provided to a third layer of the convolutional neural network, and wherein the third layer is subsequent to the first layer and prior to the second layer.

10. The method of claim 1, wherein the vehicle control result is associated with one or more of braking, steering, changing lanes, accelerating, and/or merging into a different lane.

11. A computer program product, the computer program product being embodied in a is non-transitory computer readable storage medium and comprising computer instructions for:
    receiving an image captured using a sensor on a vehicle;
    extracting a global data component and a feature data component from the image which form input data, wherein the global data component is associated with global illumination data and the feature data component is associated with edge data;
    providing the input data to a convolutional neural network comprising a plurality of layers, wherein the plurality of layers are sequential and form respective portions of the convolutional neural network, wherein the feature data component is provided as input to a first layer of the plurality of layers, wherein the global data component and an intermediate result output from a prior layer are provided as input to a second layer of the plurality of layers, and wherein the second layer is subsequent to the first layer; and
    obtaining, based on a result of the convolutional neural network, information indicating a vehicle control result which informs autonomous operation of the vehicle.

12. The computer program product of claim 11, wherein subsequent to extraction, the global data component is downsampled, and wherein the downsampled global data component is provided as input to the second layer.

13. The computer program product of claim 11, wherein the global data component is extracted via a low-pass filter.

14. The computer program product of claim 11, wherein the feature data component is extracted via a high-pass filter.

15. The computer program product of claim 11, wherein a third data component is extracted from the image via a band-pass filter, and wherein the third data component forms part of the input data.

16. A system, comprising:
    a plurality of sensors on a vehicle;
    one or more processors and computer storage media storing instructions that when executed by the processors, cause the processors to:
    receive at least one image from at least one of the sensors;
    extract a global data component and a feature data component from the at least one image which form input data, wherein the global data component is associated with global illumination data and the feature data component is associated with edge data;

provide the input data to a convolutional neural network comprising a plurality of layers, wherein the plurality of layers are sequential and form respective portions of the convolutional neural network, wherein the feature data component is provided as input to a first layer of the plurality of layers, wherein the global data component and an intermediate result output from a prior layer are provided as input to a second layer of the plurality of layers, and wherein the second layer is subsequent to the first layer; and obtain, based on a result of the convolutional neural network, information indicating a vehicle control result which informs autonomous operation of the vehicle.

17. The system of claim 16, wherein subsequent to extraction, the global data component is downsampled, and wherein the downsampled global data component is provided as input to the second layer.

18. The system of claim 16, wherein the global data component is extracted via a low-pass filter.

19. The system of claim 16, wherein the feature data component is extracted via a high-pass filter.

20. The system of claim 16, wherein a third data component is extracted from the image via a band-pass filter, and wherein the third data component forms part of the input data.

* * * * *